(12) United States Patent
Eppolito et al.

(10) Patent No.: US 10,120,557 B2
(45) Date of Patent: Nov. 6, 2018

(54) DISPLAYING A PLURALITY OF SELECTABLE ACTIONS

(71) Applicant: eBay Inc., San Jose, CA (US)

(72) Inventors: Mark Joseph Eppolito, Portland, OR (US); Shawn Piper, Beaverton, OR (US); Brandon Fasching, Portland, OR (US); Jessica Tobar, Portland, OR (US); Chris Murray, Beaverton, OR (US)

(73) Assignee: eBay, Inc., San Jose, CA (US)

( * ) Notice: Subject to any disclaimer, the term of this patent is extended or adjusted under 35 U.S.C. 154(b) by 239 days.

(21) Appl. No.: 14/252,223

(22) Filed: Apr. 14, 2014

(65) Prior Publication Data

US 2015/0293667 A1    Oct. 15, 2015

(51) Int. Cl.
*G06F 3/0481* (2013.01)
*G06F 3/0488* (2013.01)
*G06F 3/0482* (2013.01)

(52) U.S. Cl.
CPC .......... *G06F 3/0488* (2013.01); *G06F 3/0482* (2013.01)

(58) Field of Classification Search
CPC .............. G06F 3/0482; G06F 3/04817; G06F 3/04842; G06F 3/0481; G06F 3/0488; G06F 3/04883
See application file for complete search history.

(56) References Cited

U.S. PATENT DOCUMENTS

| | | | |
|---|---|---|---|
| 6,496,776 B1 | 12/2002 | Blumberg et al. | |
| 8,341,519 B1 | 12/2012 | Warr et al. | |
| 8,564,544 B2 | 10/2013 | Jobs et al. | |
| 2002/0089546 A1* | 7/2002 | Kanevsky | G09G 5/14 715/800 |
| 2006/0224962 A1* | 10/2006 | Ostojic | G06F 3/0481 715/716 |
| 2009/0327963 A1* | 12/2009 | Mouilleseaux | G06F 3/04883 715/834 |
| 2012/0011462 A1* | 1/2012 | Westerman | G06F 3/0416 715/773 |

(Continued)

FOREIGN PATENT DOCUMENTS

WO    WO-2015160765 A1    10/2015

OTHER PUBLICATIONS

"International Application Serial No. PCT/US2015/025695, International Search Report dated Jul. 23, 2015", 2 pgs.

(Continued)

*Primary Examiner* — Sang H Kim
(74) *Attorney, Agent, or Firm* — Wolfe-SBMC (57) ABSTRACT

An item page may be displayed on a client device in response to a request to view an item page from the client device. They item page may include a description of the item. An icon may be generated and the icon may be displayed within a portion of the displayed item page at an icon location. A plurality of selectable actions each being performable with respect to the item described by the item page may be generated and displayed in response to an initial gesture being performed at the icon location for at least a pre-defined threshold duration. Lastly, the plurality of selectable actions may be displayed around the generated icon and within a pre-defined distance from the icon location of the generated icon.

20 Claims, 8 Drawing Sheets

(56) References Cited

U.S. PATENT DOCUMENTS

| | | | |
|---|---|---|---|
| 2013/0019174 A1* | 1/2013 | Gil | G06F 3/04812 |
| | | | 715/711 |
| 2013/0086056 A1* | 4/2013 | Dyor | G06F 3/167 |
| | | | 707/730 |
| 2013/0173445 A1* | 7/2013 | Johnson | G06Q 40/04 |
| | | | 705/37 |
| 2013/0301926 A1 | 11/2013 | Eilat et al. | |
| 2014/0035826 A1* | 2/2014 | Frazier | G06F 3/0482 |
| | | | 345/173 |
| 2014/0068516 A1 | 3/2014 | Escobedo et al. | |
| 2014/0201681 A1* | 7/2014 | Mahaffey | H04M 1/72569 |
| | | | 715/846 |

OTHER PUBLICATIONS

"International Application Serial No. PCT/US2015/025695, Written Opinion dated Jul. 23, 2015", 5 pgs.

\* cited by examiner

DISPLAYING A PLURALITY OF SELECTABLE ACTIONS

TECHNICAL FIELD

The subject matter disclosed herein generally relates to the processing of data. Specifically, the present disclosure addresses systems and methods to display a plurality of selectable actions.

BACKGROUND

An item page may include a set of options displayed on the item page. The set options may be displayed when the item page is loaded onto a device, such as a mobile device of the user. In many instances, the options are dispersed across the item page. Therefore, the user may have to navigate or scroll through the item page in order to select an option.

BRIEF DESCRIPTION OF THE DRAWINGS

Some embodiments are illustrated by way of example and not limitation in the figures of the accompanying drawings.

DETAILED DESCRIPTION

Example methods and systems are directed to displaying a plurality of selectable actions. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A user operating a device may browse an item page that is displayed on a screen of the device. In some instances, the device may be a portable mobile device, such as a smartphone or a tablet, with internet capabilities. Moreover, the screen of the user device may be a touch sensitive screen that detects physical contact. In order to improve user experience of browsing the item page, a system may generate an icon that is displayed on the screen of the device. The generated icon may occupy a portion of the item page displayed on the device. The user may interact with the item page displayed on the device by performing a gesture on the touch screen of the device where the generated icon is displayed. For example the gesture may involve the user pressing down on the screen of the user device corresponding to where the generated icon is displayed. Once the initial gesture is detected as being performed by the user, a plurality of options may be displayed radially along the generated icon. Each of the plurality of options may also be selected by continuing the gesture from where the generated icon is displayed to one of the displayed plurality of options. For example, the user may press and hold their finger on the icon and then swipe the finger over to one of the plurality of options. The plurality of options may be actions performable with respect to the item page, such as bidding, purchasing, or adding the item to a shopping cart. In this way, the user may view and select options with respect to the item page with relative ease and not have to scroll through the item page to select an action.

Figure 1:
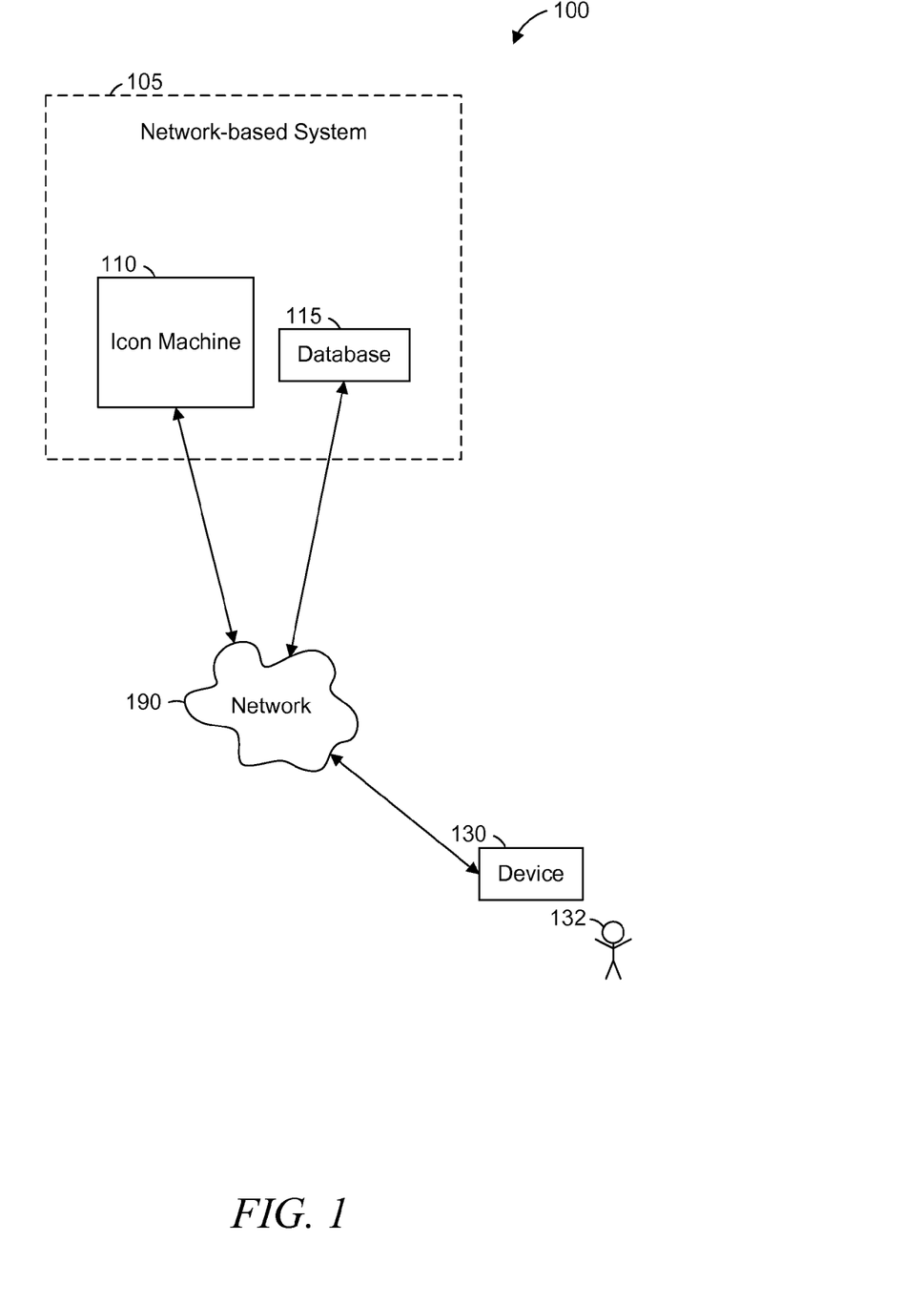
FIG. 1 is a network diagram illustrating a network environment 100 suitable for displaying a plurality of selectable actions, according to some example embodiments.

FIG. 1 is a network diagram illustrating a network environment 100 suitable for displaying a plurality of selectable actions, according to some example embodiments. The network environment 100 includes an icon machine 110, a database 115, and device 130, all communicatively coupled to each other via a network 190. Also shown in FIG. 1 is user 132. The user 132 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. In some instances, the device 130 may be a portable mobile device, such as a smartphone, with internet capabilities. Moreover, the screen of the device 130 may be a touch sensitive screen that detects physical contact.

Any of the machines, databases, or devices shown in FIG. 1 may be implemented in a general-purpose computer modified (e.g., configured or programmed) by software to be a special-purpose computer to perform one or more of the functions described herein for that machine, database, or device. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the icon machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Figure 2:
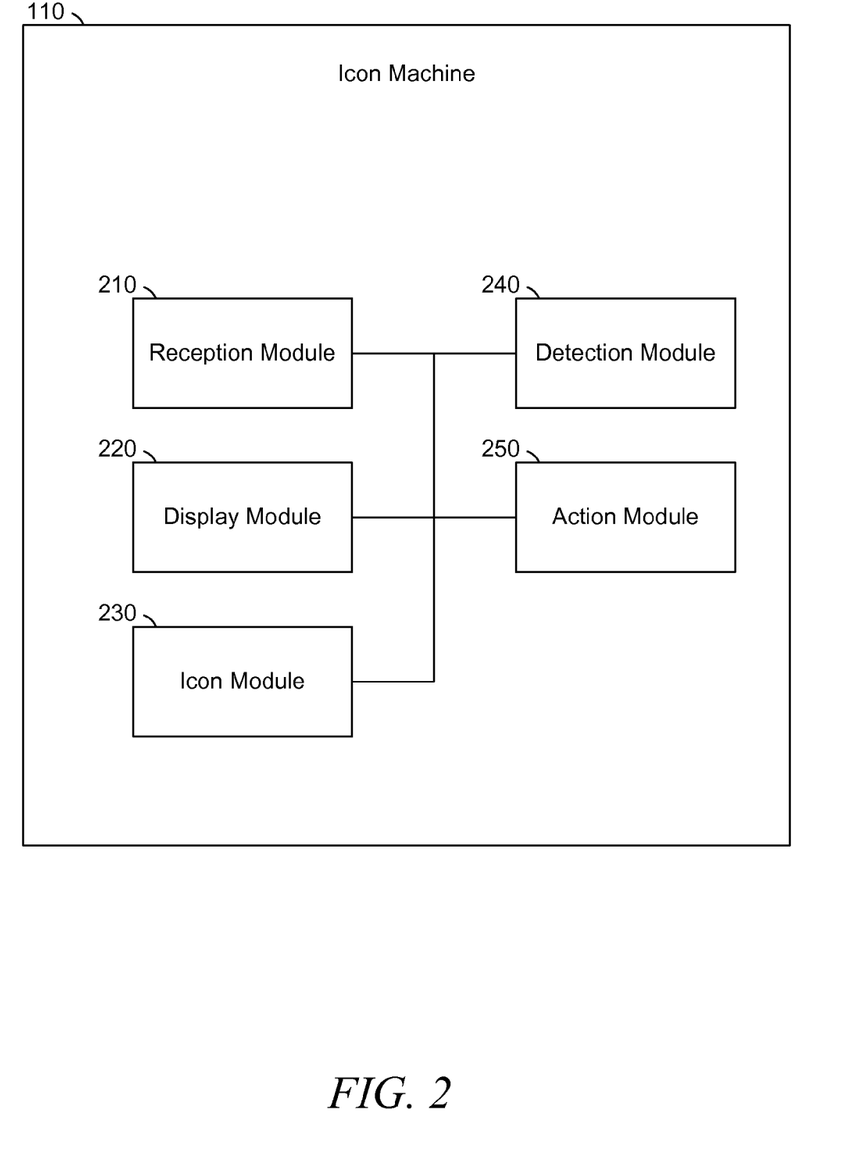
FIG. 2 is a block diagram illustrating components of an icon machine suitable, according to some example embodiments.

FIG. 2 is a block diagram illustrating components of the icon machine 110, according to some example embodiments. The icon machine 110 is shown as including a reception module 210, a display module 220, an icon module 230, a detection module 240, and an action module 250, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In various example embodiments, the reception module 210 is configured to receive a request to view an item from a client device. A user (e.g., user 132) operating the client device (e.g., 130) may send a request to the network-based system 105 to view the item.

In various example embodiments, the display module 220 is configured to display an item page on the client device in response to receiving the request to view the item from the client device. The item page corresponding to the item may be stored in the database 115. Therefore, the display module 220 may retrieve the item page from the database 115 and then cause the item page to be displayed in the client device. In various example embodiments, the displayed item page may also include a description of the item.

In various example embodiments, the icon module 230 is configured to generate an icon that is displayed within a portion of the displayed item page at the icon location. The icon module 230 may cause the client device to display generated icon within the portion of the displayed item page at the icon location. In some instances, the icon location corresponds to a location on a screen of the client device. In other words, the icon location may be set at a pre-determined location on the screen of the client device. Moreover, the generated icon may remain fixed at the icon location on the screen of the client device until being moved by a movement gesture, as further explained below. The icon generated by the icon module 230 can take on various forms or shapes (e.g., a circle, square, arc, and the like). Moreover, the generated icon may be laid over the item page at the icon location and may obscure a portion of the item page. In some instances, the display module 220 may adjust the transparency of the generated icon. For example, the display module 220 may cause the generated icon to be see-through, allowing the portion of the item page obscured by the generated icon to be viewed. In other words visibility of the generated icon may decrease in order to allow the portion of the item page to be displayed. In various example embodiments, the display module 220 may highlight the generated icon in response to the detection module 240 determining that the amount of interaction with the generated icon drops below the pre-defined threshold, as further explained below. In various example embodiments, generated icon may remain fixed on the screen of the client device at the icon location even as the user is scrolling through item page. Therefore, the generated icon may be easily accessed by the user to perform a gesture at any time. In various example embodiments, the generated icon is movable from the icon location at the first portion of the displayed item page to a second portion of the displayed item page. For instance, the user may press down on the icon and drag the icon to another location on the item page. In response, the icon being may be moved by the user to the further icon location.

In various example embodiments, the detection module 240 is configured to receive via the client device the indication of an initial gesture being performed within the portion of the item page at the icon location for at least a pre-defined threshold duration. The screen of the client device may be touch-sensitive and can be used to receive user inputs, which are sent from the client device to the detection module 240. This may include the client device detecting a single point of contact on screen of the client device corresponding to the icon location and sending the information to the detection module 240. For example, the user may press their finger over the screen of the client device at the icon location and the client device may send the data to the detection module 240. The detection module 240 may further receive via the client device an indication of a selection gesture being performed from the icon location of the generated icon to an action location of a selected action among the plurality of selectable actions. In other words, the selection gesture may be used to indicate the selected action. This may include the client device detecting movement of the single point of contact on the screen of the client device from an area corresponding to the icon location to an area corresponding to the action location and sending this information to the detection module 240. In various example embodiments, the initial gesture and the selection gesture may be part of a single continuous gesture without interruption between the initial gesture and the selection gesture. For example, a user of the client device may press and hold their finger on the icon and then drag their finger over to one of the plurality of actions. In various example embodiments, the detection module 240 is further configured to receive via the client device an indication of a movement gesture being performed from the icon location at a first portion of the displayed item page to a second portion of the displayed item page. This may include the client device detecting a press on the screen corresponding to the icon location and then detecting the press being sustained from the icon location over to the second portion of the displayed item page. The movement gesture may be used to move the generated icon. In various example embodiments, the detection module 240 may receive an indication of a gesture being performed within a portion of the item page other than the icon location (e.g., a gesture performed outside the icon location). In various example embodiments, the detection module 240 is further configured to determine that an amount of interaction with the generated icon drops below a pre-defined threshold. For instance, the detection module 240 may determine that the user of the client device has not interacted with the generated icon for at least ten seconds. In various example embodiments, the detection module 240 is further configured to receive via the client device an indication of a gesture being performed within a portion of the item page other than the action locations of the plurality of selectable actions (e.g., a gesture performed outside the action locations of the plurality of selectable actions). For instance the user may move their finger away from the plurality of selectable actions and begin scrolling through the item page. In doing so, the plurality of selectable actions may collapse and no longer be displayed so that the plurality of selectable actions will no longer obscure the item page. Any of the above mentioned gestures may also involve more than a single point of contact, such as two points of contact (e.g., two fingers). Moreover, the types of gestures may also vary and include other embodiments (e.g., press and hold, single tap, double tap).

In various example embodiments, the action module 250 is configured to generate a plurality of selectable actions each being performable with respect to the item described by the item page. The generating of the plurality of selectable actions may be performed in response to the detection module 240 receiving the indication of the initial gesture being performed at the icon location for at least the pre-defined threshold duration. The plurality of selectable actions may each be displayed within a portion of the item page at an action location, as previously explained above. In various example embodiments, the plurality of selectable actions may include placing a bid on the item displayed in the item page, purchasing the item displayed in the item page, adding the item displayed in the item page to a wish list, or any suitable combination thereof. The plurality of selectable actions may also include any options within the item page that are made available to the user. In some instances, the action module 250 is further configured to generate a further plurality of selectable actions. The further plurality of selectable actions may correspond to an array of values for which a bid may be placed on the item described by the item page.

The display module 220 is further configured to display the generated icon within the portion of the item page at the icon location. As stated previously, the item page may be displayed on the client device. In various example embodiments, the display module 220 is further configured to display the generated plurality of selectable actions on the client device. Moreover, the generated plurality of selectable actions may be displayed around the icon. Specifically, the plurality of selectable actions may be displayed around the generated icon and within a pre-defined distance from an icon location of the generated icon. Further, each of the plurality of selectable actions may be displayed at an action location within the pre-defined distance from the icon location. In various example embodiments, the generated plurality of selectable actions are displayed around the icon in response to an initial gesture being performed over the generated icon within the portion of the item page at the icon location for at least a pre-defined threshold duration. In various example embodiments, the detection module 240 may receive an indication from the client device of the initial gesture being performed, as explained above.

In various example embodiments, the display module 220 is further configured to highlight the selected action indicated by the selection gesture at the action location within the pre-defined distance from the icon location. The selection gesture may be used to indicate the selected action. In various example embodiments, the display module 220 may cause the highlighted action to animate (e.g., shake, pop-up) or may draw a border around the highlighted action In various example embodiments, the display module 220 is further configured to increase transparency of the generated icon in response to the detection module 240 receiving an indication of a gesture being performed within a portion of the item page other than the icon location. In various example embodiments, the display module 220 is further configured to remove each of the plurality of selectable actions from being displayed at their respective locations within the displayed item page. The display module 220 may remove the plurality of selectable actions in response to the detection module 240 receiving an indication of a gesture being performed within a portion of the item page other than the action locations of the plurality of selectable actions. In other words, when the user performs a gesture outside of where the plurality of actions are located, then the plurality of actions may collapse and no longer be radially displayed along the generated icon.

Figure 3:
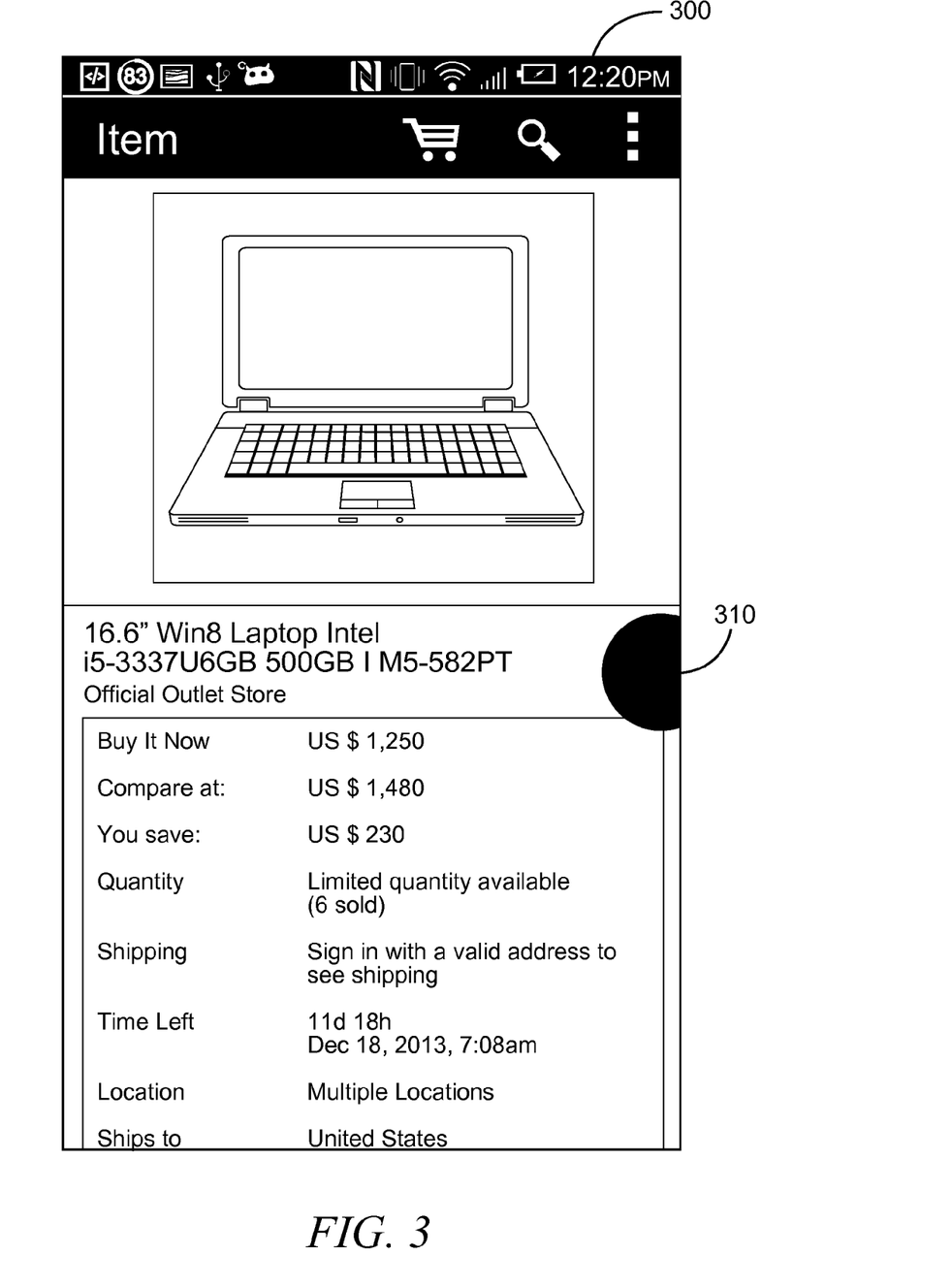
FIG. 3-5 is an example user interface of an icon displayed over an item page, according to some example embodiments.

FIG. 3 is an example user interface 300 of an icon displayed over an item page, according to some example embodiments. The example user interface 300 may be displayed on a screen of a user device operated by a user. Moreover, the screen of the user device may be sensitive to touch. The generated icon 310 may be displayed on a corner of the item page and may be selectable by the user to retrieve a plurality of selectable actions. In other words, the user may perform an initial gesture on the screen of the user device over the generated icon 310 for at least a pre-defined threshold duration, which may cause the user device to send an indication of the initial gesture being performed to the detection module 240. Moreover, the generation icon 310 may be highlighted in response to the detection module 240 receiving the indication of the initial gesture being performed.

Figure 4:
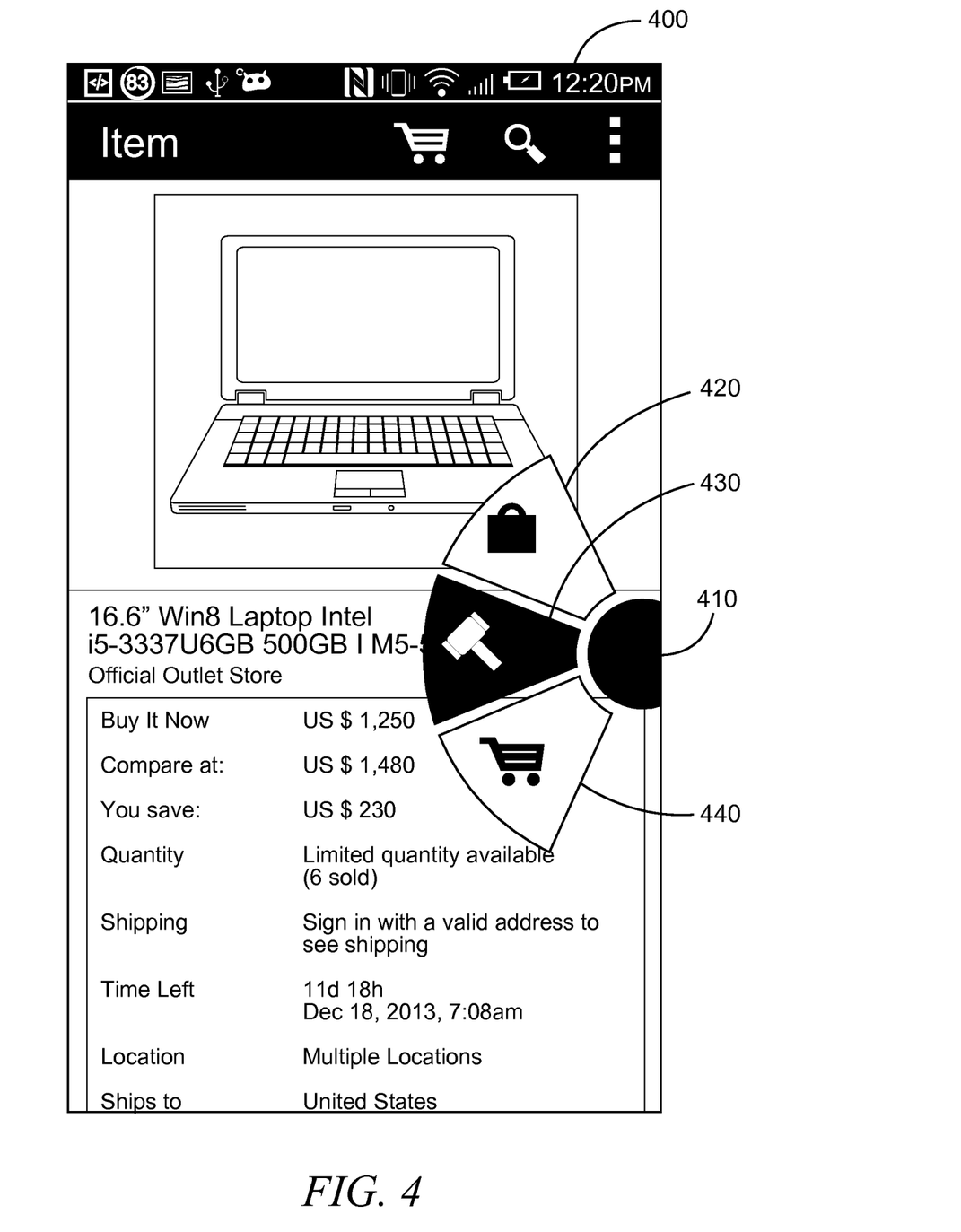

FIG. 4 is an example user interface 400 of an icon displayed over an item page, according to some example embodiments. The example user interface 400 may be displayed on a screen of a user device operated by a user. Moreover, the example user interface 400 may include a plurality of selectable actions. Actions 420, 430, and 440 may be generated by the action module 250 in response to the detection module 240 receiving the indication of the initial gesture being performed over the generated icon 410. Action 420 may correspond to an action to purchase the item displayed within the item page. Action 430 may correspond to an action to bid on the item displayed within the item page. Action 440 may correspond to an action to add the item displayed within the item page to a shopping cart. Each of the actions may be selected by a selection gesture being performed from the generated icon to one of the actions 420, 430, and 440. For example, the user may press and hold their finger down over the screen over the icon 410 and then drag their finger over to one of the plurality of selectable actions 420, 430, and 440. In some instances, the selection gesture is complete when the user releases their finger from the screen of the user device. In some instances, the selected action may be highlighted. As shown in FIG. 4, action 430 may be highlighted in response to being selected by a selection gesture performed from the generated icon 410 to action 430. As previously explained, a selection gesture may include the user pressing their finger over on the screen over the generated icon 410, dragging their finger over to the action 430, and then releasing their finger from the screen. Moreover, as the user scrolls across the item page, the icon 410 may remain fixed at the icon location on the screen of the user device.

Figure 5:
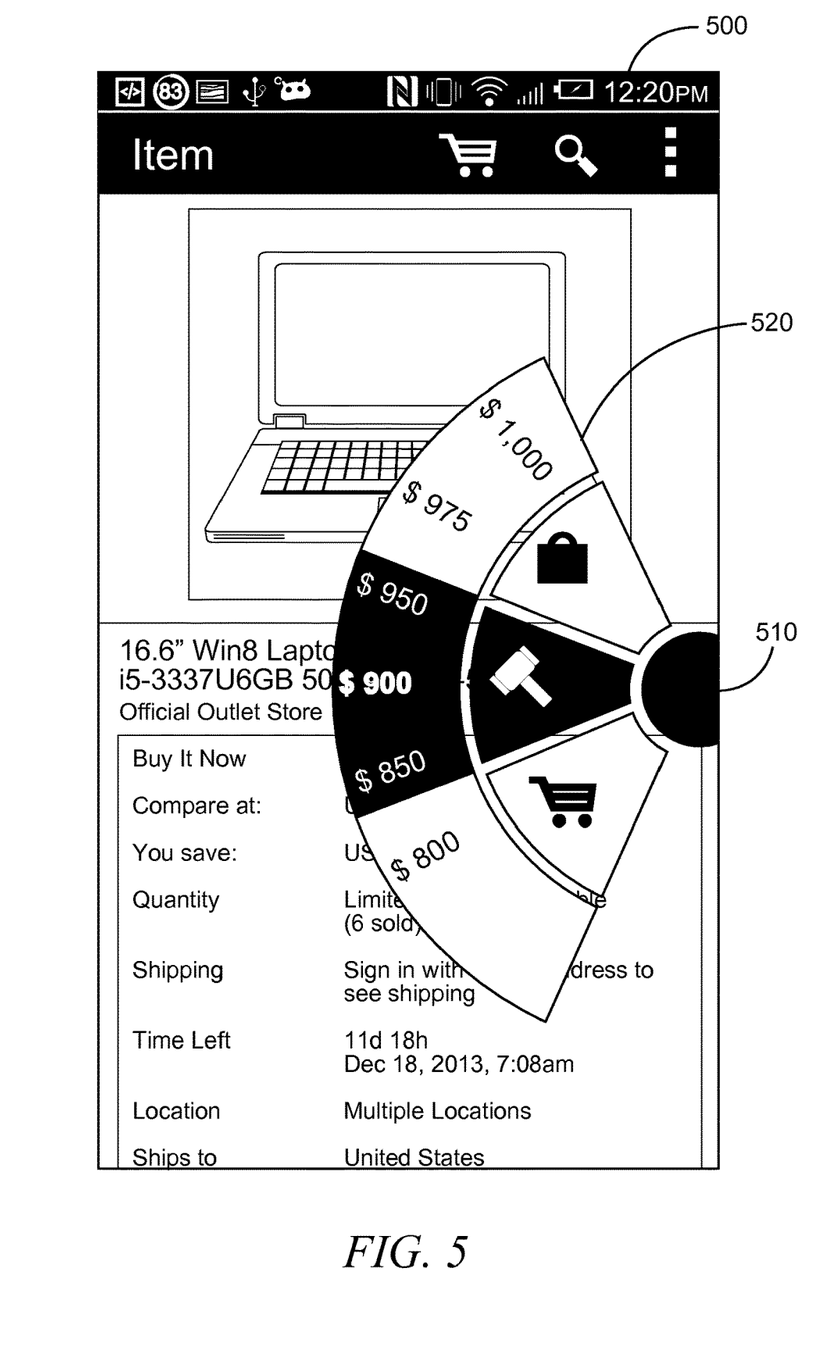

FIG. 5 is an example user interface 500 of an icon displayed over an item page, according to some example embodiments. The example user interface 500 may be displayed on a screen of a user device operated by a user. Moreover, the example user interface 500 may include a further plurality of selectable actions 520. The further plurality of selectable actions may be retrieved by the action module 250 in response to the detection module 240 receiving the indication of the selection gesture from the generated icon to one of the actions 420, 430, and 440 of FIG. 4. For example, the further plurality of selectable actions may be retrieved in response to the detection module 240 receiving the indication of the selection gesture being performed from icon 510 to action 430 of FIG. 4. As shown in FIG. 5, the further plurality of selectable actions may include options to submit bids corresponding to the amounts of 800, 850, 900, 950, 975, and 1000. In some instances, the further plurality of selectable actions 520 may be highlighted. As shown in FIG. 5, options to submit bids corresponding to the amounts of 850, 900, and 950 may be highlighted. The display module 220 may be further configured to highlight the options to submit bids corresponding to the amounts of 850, 900, and 950 as a result of being selected by a selection gesture from action 430 of FIG. 4 over to a portion of the screen where the bids corresponding to the amounts of 850, 900, and 950 are displayed.

Figure 6:
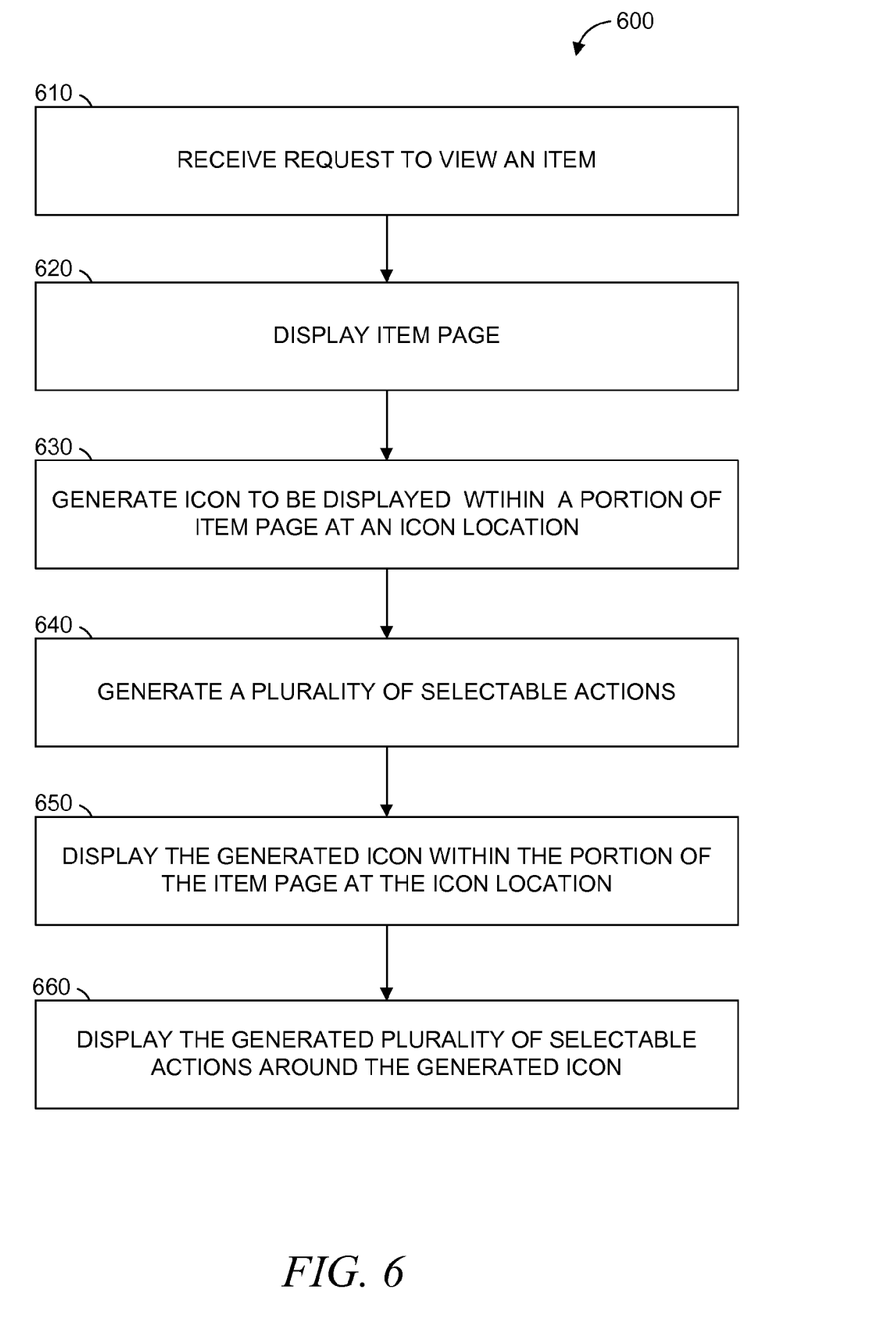
FIG. 6-7 is a flowchart illustrating operations of performing a method of displaying a plurality of selectable actions, according to some example embodiments.

FIG. 6 is a flowchart illustrating operations of performing a method of displaying a plurality of selectable actions, according to some example embodiments. As shown in FIG. 6, the method 600 includes operations 610, 620, 630, 640, 650, and 660.

At operation 610, the reception module 210 may receive a request to view an item from a client device. A user operating the client device may send a request to the reception module 210 to view the item.

At operation 620, the display module 220 may display the item page on the client device in response to receiving the request to view the item from the client device.

At operation 630, the icon module 230 may generate an icon that is displayed within a portion of the displayed item page at the icon location.

At operation 640, the action module 240 may generate a plurality of selectable actions each being performable with respect to the item described by the item page.

At operation 650, the display module 220 may display the generated icon within the portion of the item page at the icon location.

At operation 660, the display module 220 may display the plurality of selectable actions around the generated icon and within a pre-defined distance from an icon location of the generated icon.

Figure 7:
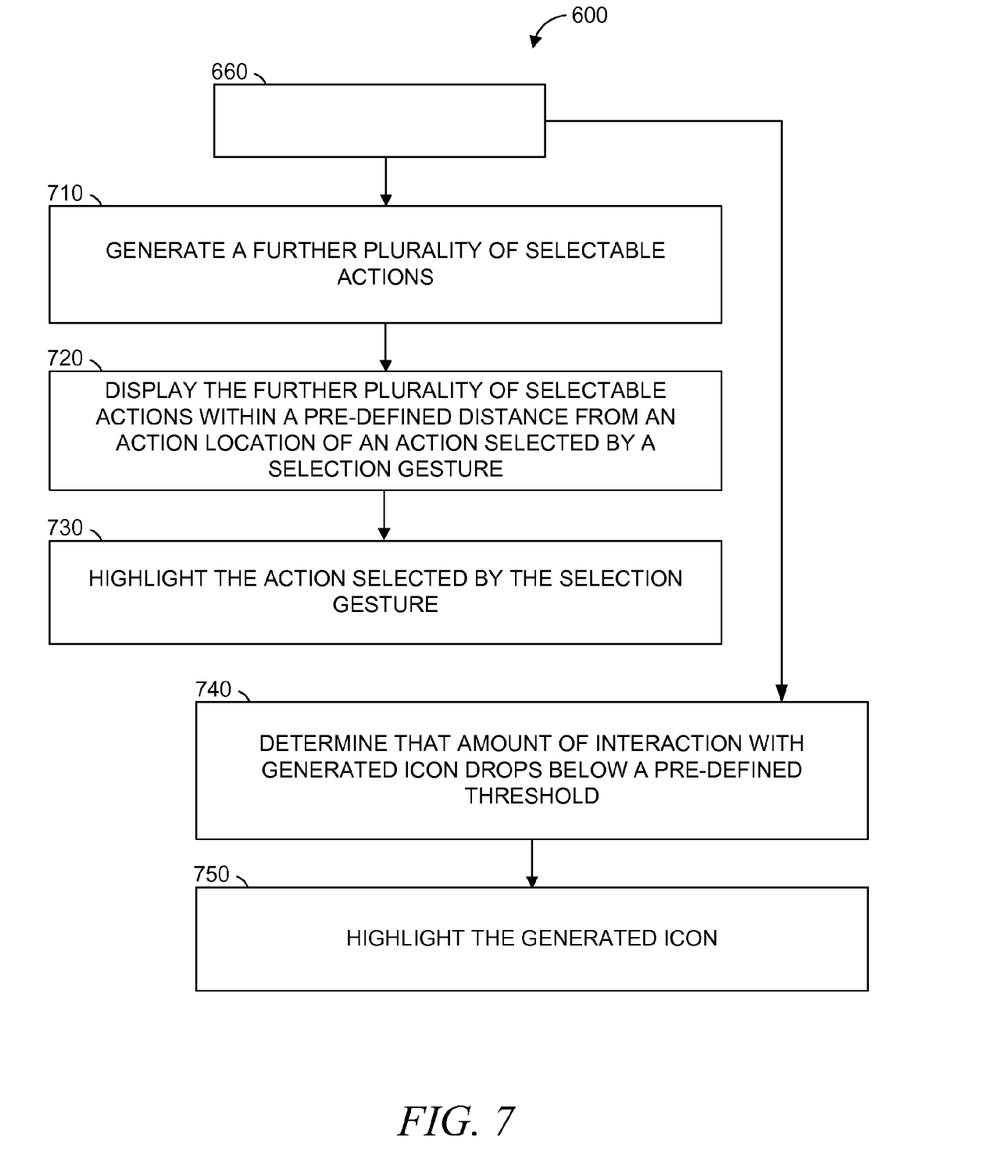

As shown in FIG. 7, the method 600 may include one or more of operations 710, 720, 730, 740, and 750. One or more of operations 710-750 may be performed as part (e.g., a precursor task, a subroutine, or a portion) of operation 660 of FIG. 6.

At operation 710, the action module 240 may generate a further plurality of selectable actions.

At operation 720, the display module 220 may display the further plurality of selectable actions within a pre-defined distance from an action location of an action selected by a selected gesture.

At operation 730, the display module 220 may highlight the action selected by the selection gesture. For instance, the display module 220 may cause a border around the selected action to be outlined. Alternatively, the display module 220 may cause the selected action to be illuminated.

At operation 740, the detection module 240 may determine that the amount of interaction with the generated icon drops below a pre-defined threshold.

At operation 750, the display module 220 may highlight the generated icon in response to the detection module 240 determining that the amount of interaction with the generated icon drops below the pre-defined threshold.

Figure 8:
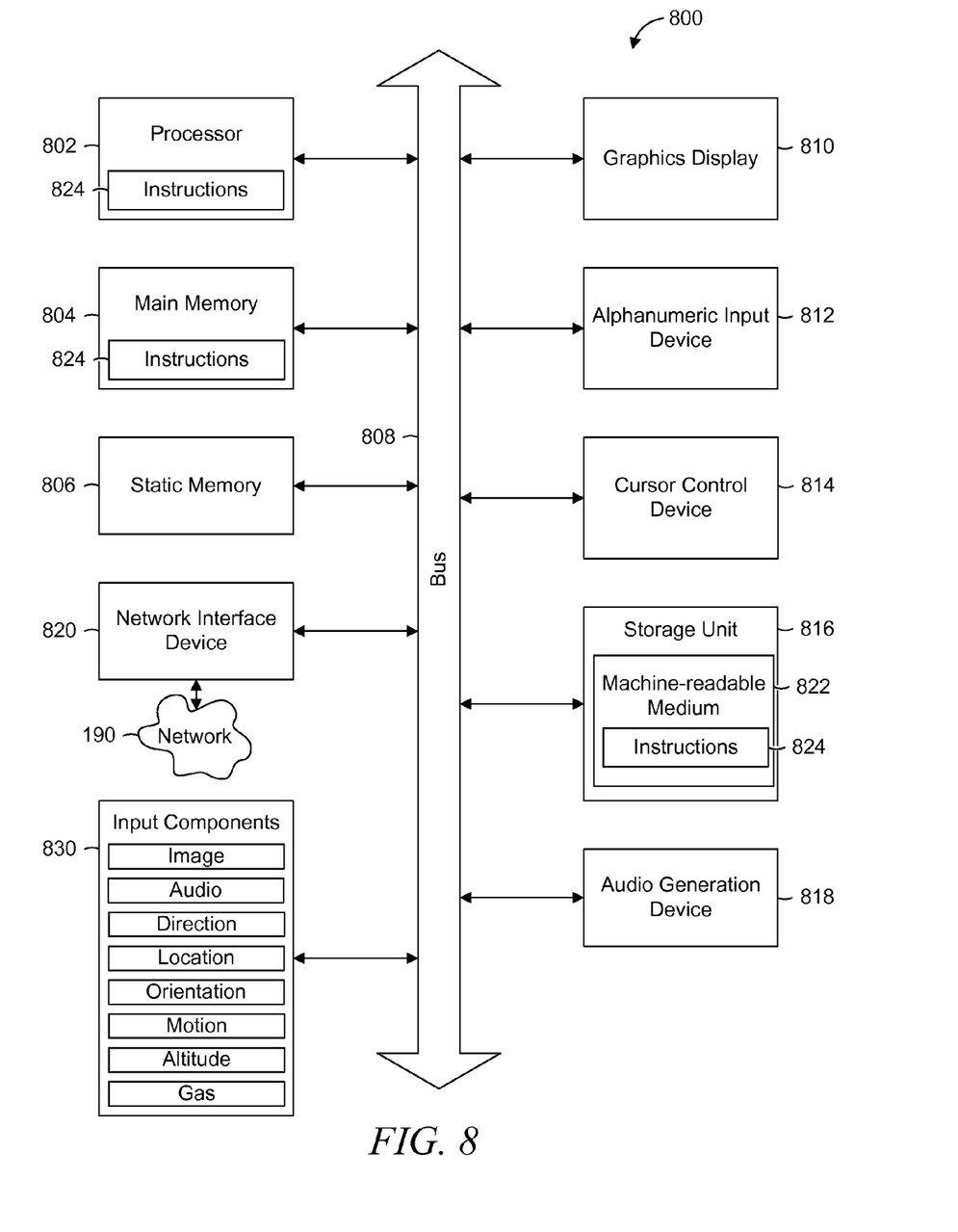
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions 824 from a machine-readable medium 822 (e.g., a machine-readable storage medium, a computer-readable storage medium, or any suitable combination thereof) and perform any one or more of the methodologies discussed herein, in whole or in part. Specifically, FIG. 8 shows the machine 800 in the example form of a computer system within which the instructions 824 (e.g., software, a program, an application, an applet, an app, or other executable code) for causing the machine 800 to perform any one or more of the methodologies discussed herein may be executed, in whole or in part. In alternative embodiments, the machine 800 operates as a standalone device or may be connected (e.g., networked) to other machines. In a networked deployment, the machine 800 may operate in the capacity of an icon machine or a client machine in a server-client network environment, or as a peer machine in a distributed (e.g., peer-to-peer) network environment. The machine 800 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include any collection of machines that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, an audio generation device 818 (e.g., a sound card, an amplifier, a speaker, a headphone jack, or any suitable combination thereof), and a network interface device 820.

The storage unit 816 includes the machine-readable medium 822 (e.g., a tangible and non-transitory machine-readable storage medium) on which are stored the instructions 824 embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered machine-readable media (e.g., tangible and non-transitory machine-readable media). The instructions 824 may be transmitted or received over the network 190 via the network interface device 820. For example, the network interface device 820 may communicate the instructions 824 using any one or more transfer protocols (e.g., hypertext transfer protocol (HTTP)).

In some example embodiments, the machine 800 may be a portable computing device, such as a smart phone or tablet computer, and have one or more additional input components 830 (e.g., sensors or gauges). Examples of such input components 830 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof. Moreover, the term "machine-readable medium" may exclude transitory forms of signal transmission (e.g., a propagating electrical or electromagnetic signal).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method performed by a processor of a machine, the method comprising:
    displaying an item page on a client device in response to a request to view an item from the client device, the item page including a description of the item;
    generating an icon that corresponds to an icon location within a portion of the item page;
    generating a plurality of selectable graphical actions each being an action that may be selected, by way of selection of a corresponding icon, to be performed with respect to the item described by the item page said graphical actions corresponding to one or more of an action to purchase the item, bid on the item, or add the item to a shopping cart;
    displaying the generated icon within the portion of the item page at the icon location;
    displaying, in response to an initial gesture being performed at the icon location, the generated plurality of selectable graphical actions represented by the respective icons radially around the generated icon within a pre-defined distance from the icon location of the generated icon;
    generating a further plurality of selectable actions; and
    displaying, responsive to selection of at least one of the graphical actions, the further plurality of selectable actions radially around the generated icon within a pre-defined distance from an action location of said selected graphical action, at least some of the further plurality of selectable actions expanding radially outwardly of the individual graphical actions represented by a respective icon and wherein said graphical action corresponding to the action to bid on the item is configured to, when selected, display a range of selectable values that can be selected to bid on the item.

2. The method of claim 1, further comprising receiving an indication of the initial gesture being performed within the portion of the item page at the icon location.

3. The method of claim 1, further comprising:
    highlighting the selectable graphical action selected by the selection gesture at the action location within the pre-defined distance from the icon location.

4. The method of claim 1, wherein the selection gesture is performed from the icon location of the generated icon to the action location of the selected action.

5. The method of claim 1, wherein the generated icon is moveable from the icon location to a further icon location within the displayed item page.

6. The method of claim 1, wherein a transparency of the generated icon increases in response to a gesture being performed outside the icon location of the generated icon.

7. The method of claim 1, wherein the plurality of selectable graphical actions includes an action for adding the item displayed in the item page to a wish list.

8. A system comprising:
    one or more processors and executable instructions accessible on a computer-readable medium that, when by the one or more processors, cause the one or more processors to perform operations comprising:
    receiving a request to view an item from a client device;
    displaying an item page on the client device in response to the request to view the item from the client device, the item page including a description of the item;

generating an icon that corresponds to an icon location within a portion of the item page;

generating a plurality of selectable graphical actions each being an action that may be selected, by way of a corresponding icon, to be performed with respect to the item described by the item page, said graphical actions corresponding to one or more of an action to purchase the item, bid on the item, or add the item to a shopping cart;

displaying the generated icon within the portion of the item page at the icon location;

displaying, in response to an initial gesture being performed at the icon location, the generated plurality of selectable graphical actions represented by the respective icons radially around the generated icon within a pre-defined distance from the icon location of the generated icon;

generating a further plurality of selectable actions; and displaying, responsive to selection of at least one of the graphical actions, the further plurality of selectable actions radially around the generated icon within a pre-defined distance from an action location of said selected graphical action, at least some of the further plurality of selectable actions expanding radially outwardly of the individual graphical actions represented by a respective icon and wherein said graphical action corresponding to the action to bid on the item is configured to, when selected, display a range of selectable values that can be selected to bid on the item.

9. The system of claim 8, wherein the operations further comprise receiving an indication of the initial gesture being performed within the portion of the item page at the icon location.

10. The system of claim 8, wherein the operations further comprise highlighting the action selected by the selection gesture at the action location within the pre-defined distance from the icon location.

11. The system of claim 8, wherein the generated icon is moveable from the icon location to a further icon location within the displayed item page.

12. The system of claim 8, wherein a transparency of the generated icon increases in response to a gesture being performed outside the icon location of the generated icon by a user operating the client device.

13. The system of claim 8, wherein the plurality of selectable graphical actions includes an action for adding the item displayed in the item page to a wish list.

14. A non-transitory machine-readable medium storing instructions that, when executed by one or more processors of a machine, cause the machine to perform operations comprising:

displaying an item page on a client device in response to a request to view an item from the client device, the item page including a description of the item;

generating an icon that corresponds to an icon location within a portion of the item page;

generating a plurality of selectable graphical actions each being an action that may be selected, by way of selection of a corresponding icon, to be performed with respect to the item described by the item page, said graphical actions corresponding to one or more of an action to purchase the item, bid on the item, or add the item to a shopping cart;

displaying the generated icon within the portion of the item page at the icon location;

displaying, in response to an initial gesture being performed at the icon location, the generated plurality of selectable graphical actions represented by the respective icons radially around the generated icon within a pre-defined distance from the icon location of the generated icon;

generating a further plurality of selectable actions; and displaying, responsive to selection of at least one of the graphical actions, the further plurality of selectable actions radially around the generated icon within a pre-defined distance from an action location of said selected graphical action, at least some of the further plurality of selectable actions expanding radially outwardly of the individual graphical actions represented by a respective icon and wherein said graphical action corresponding to the action to bid on the item is configured to, when selected, display a range of selectable values that can be selected to bid on the item.

15. The non-transitory machine-readable medium of claim 14, the operations further comprising receiving an indication of the initial gesture being performed within the portion of the item page at the icon location.

16. The non-transitory machine-readable medium of claim 14, the operations further comprising:

highlighting the selectable graphical action selected by the selection gesture at the action location within the pre-defined distance from the icon location.

17. The non-transitory machine-readable medium of claim 14, wherein the selection gesture is performed from the icon location of the generated icon to the action location of the selected action.

18. The non-transitory machine-readable medium of claim 14, wherein the generated icon is moveable from the icon location to a further icon location within the displayed item page.

19. The non-transitory machine-readable medium of claim 14, wherein a transparency of the generated icon increases in response to a gesture being performed outside the icon location of the generated icon.

20. The non-transitory machine-readable medium of claim 14, wherein the plurality of selectable graphical actions includes an action for adding the item displayed in the item page to a wish list.

* * * * *

UNITED STATES PATENT AND TRADEMARK OFFICE
CERTIFICATE OF CORRECTION

| | |
|---|---|
| PATENT NO. | : 10,120,557 B2 |
| APPLICATION NO. | : 14/252223 |
| DATED | : November 6, 2018 |
| INVENTOR(S) | : Mark Joseph Eppolito et al. |

Page 1 of 1

It is certified that error appears in the above-identified patent and that said Letters Patent is hereby corrected as shown below:

In the Claims

In Column 13, Lines 44-45, in Claim 12, delete "icon by a user operating the client device." and insert -- icon. --, therefor.

Signed and Sealed this
Second Day of April, 2019

Andrei Iancu
*Director of the United States Patent and Trademark Office*